Patented Mar. 27, 1934

1,952,676

UNITED STATES PATENT OFFICE 1,952,676

OIL-SOLUBLE SYNTHETIC RESINS AND PROCESS OF PREPARING THE SAME

Georg Kränzlein and Arthur Voss, Frankfort-on-the-Main-Hochst, Germany, assignors to I. G. Farbenindustrie Aktiengesellschaft, Frankfort-on-the-Main, Germany No Drawing. Application June 30, 1932, Serial No. 620,295. In Germany July 20, 1931

12 Claims. (Cl. 260—98)

The present invention relates to oil-soluble synthetic resins and to a process of preparing the same.

We have found that new oil-soluble artificial resins can be obtained by first heating in known manner natural resins containing free carboxylic groups with aromatic compounds which contain the group

(one X representing a halogen atom, the other X representing a hydrogen or halogen atom) and which may furthermore contain an oxygen containing substituent, and then esterifying the product thus obtained with polyhydric alcohols. As resin components there may be used the known recent natural resins, such as colophony, or pine resin; as aromatic compounds containing the group

(one X representing a halogen atom, the other X representing a hydrogen or halogen atom) there may be used for instance benzyl chloride, tolyl chloride, xylyl chloride, benzalchloride, xylylene dichloride, chloromethylnaphthalene, dichloromethylated naphthalene, halogen addition products of naphthalene, 1.4-chloromethylphenolethylether, 1.2-chloromethylbenzoic acid, chlorinated phenanthrene, chlorinated abietic acid; as compounds containing hydroxyl groups there may be used all polyhydric alcohols, such as glycerine, glycol, sorbite, pentaerythrite, furthermore also monohydric alcohols, for instance high-boiling monohydric alcohols, such as benzyl alcohol, higher fat alcohols or the like.

The reaction between the natural resins and the halogen containing compounds is performed by gradually heating the components up to a temperature between about 150° C. and about 220° C. until the evolution of hydrogen halide is complete and the reaction product is substantially free from halogen. The operation may be conducted in the presence of solvents and in the presence of small quantities of catalytically acting condensing agents, such as zinc chloride. The proportions of the starting materials may vary within wide limits, it being preferable to use an excess of natural resin.

The condensation product thus obtained can directly be esterified in known manner with the alcohol. The esterification may, for instance, be conducted in the presence of solvents and in the presence of known esterifying catalysts.

Furthermore, the order of both processes may be reversed by first esterifying the natural resin and then reacting with the halogen-containing aromatic hydrocarbon upon the esterified resin.

The neutral reaction products obtained represent resins the carboxylic groups of which are esterified, the nucleus being condensed with the elimination of hydrogen halide with a compound of the following constitution:

wherein R represents an aromatic nucleus which may contain an oxygen-containing substituent and/or alkyl groups, one X represents a halogen atom and the other X represents a hydrogen or a halogen atom. They are distinguished by a high softening point and they can readily be boiled with drying oils so as to produce valuable varnishes of good drying properties, excellent hardness, elasticity, stability to atmospheric influences and high fastness to light. They differ from the reaction products of the recent natural resins with halogen-containing aromatic hydrocarbons or from the oxygen-containing derivatives thereof in that they are insoluble in alkalies, whereas the above mentioned starting materials are soluble in alkalies and, owing to their acid character, unsuitable for preparing oil-lacquers.

The following examples serve to illustrate our invention, but they are not intended to limit it thereto, the parts being by weight:

(1) A mixture of 160 parts of American colophony and 40 parts of benzyl chloride is gradually heated. The evolution of hydrogen chloride begins at a temperature somewhat above 100° C. and may be accelerated by the addition of about 0.2 part of zinc chloride. The temperature is raised in the same degree as the evolution of hydrogen chloride slackens; finally the temperature is kept for one hour at 200° C.–210° C., while agitating the mixture in order to facilitate the evolution of gas and in order to more thoroughly mix the components. As soon as the evolution of gas is completed, 15 parts of glycerine and 50 parts of xylene are added at 100° C.; the temperature is then again raised to 240° C.–250° C. and kept there for about 4 hours. The volatile substances are eliminated at this temperature by application of a reduced pressure. There remains a light resin having an acid number of about 20, a softening point of 120° C.–125° C. It can be boiled satisfactorily with drying oils to form oil resins. The resin is soluble in aliphatic and aromatic hydrocarbons, but insoluble in alcohols and aqueous alkalies. The varnishes prepared with the resin show a good elasticity, adhesive power, resistance to atmospheric influences and fastness to light.

(2) 140 parts of Swedish resin are fused together with 25 parts of benzal bromide, whereupon the evolution of hydrogen bromide soon begins. The mixture foams up and its viscosity increases in the same degree as the reaction proceeds so that finally, in order to thoroughly mix the product, a high-boiling solvent, such as chlorobenzene, is added, whereupon the temperature is kept for 2 hours at 200° C.–210° C. As soon as the reaction is completed, the volatile constituents are eliminated at 200° C. by application of a reduced pressure. 12 parts of glycol are then added in the fused mass and the mixture is boiled for 5–6 hours in a reflux apparatus. After the volatile constituents have been distilled, a resin is obtained which possesses a high softening point and which can be boiled with drying oils so as to obtain varnishes of good fastness to light.

(3) 200 parts of Manila copal are mixed with 30 parts of xylyl chloride obtained by introducing one chlorine into a side chain of commercial xylene consisting of three isomers, whereupon the mixture is fused in a manner similar to that described in the preceding examples. As soon as the evolution of hydrogen chloride is complete, 75 parts of benzyl alcohol are added to the resinous mass and the mixture is boiled for several hours, the temperature being gradually raised to 240° C.–250° C. After the acid number has decreased to about 20, the excess of benzyl alcohol is distilled under reduced pressure. There is obtained a light-brownish resin of a high softening point which can readily be boiled with drying oils so as to obtain varnishes which are fast to light and atmospheric conditions.

(4) 200 parts of American colophony are mixed with 125 parts of a chlorinated product which is obtained by causing hydrochloric acid and formaldehyde of 40 per cent. strength to act upon xylene so that 50 per cent. of the product is mono-chlorinated, and the remainder is dichlorinated; the mixture is heated as described in the preceding examples. As the mixture becomes more and more viscous, there are added 50 parts of tetrahydronaphthalene, in order to accelerate the reaction, whereby probably a small part of the xylyl chloride reacts with tetrahydronaphthalene, without impairing, however, the result. After the reaction is complete, 25 parts of glycerine are added to the fused mass; the mixture is heated again and kept for 3–4 hours at 240° C.–250° C. When the acid number has sufficiently decreased, the volatile constituents are eliminated while applying a reduced pressure. There is obtained a light-yellow resin which is readily soluble in benzine and oil and yields varnishes which are fast to light and resistant to atmospheric influences.

(5) 150 parts of German pine resin are mixed with 50 parts of benzoic acid para-tolyl chloride obtained by chlorinating the side chain of the para-tolylbenzoic acid. The mixture is fused while stirring, as described in the preceding examples. After the evolution of hydrogen chloride has slackened which occurs, after heating for 2–3 hours at 150°C.–200° C., 25 parts of glycerine are added and the fused mass is kept at 250° C.–260° C. until the acid number has decreased to 15. The fused mass is then worked up in a manner similar to that described in the preceding examples. There is obtained a brownish-yellow clear resin which is relatively difficulty fusible. The resin is soluble in aliphatic and aromatic hydrocarbons and in drying oils. When the resin is mixed with drying oils there are obtained varnishes which are just as resistant and fast to light as the varnishes prepared with good copals.

(6) Into 120 parts of retene a certain amount of chlorine is introduced until 1 molecular proportion of retene has combined with two atomic proportions of chlorine. The chlorination product is then fused together with 120 parts of a colophony glycerine ester prepared in known manner. In order to promote intimate admixture, 60 parts of rosin oil obtained from colophony by distillation are added. The rosin oil also takes part in the reaction. When the evolution of gas has slackened, the fused mass is freed from the volatile constituents as described in the preceding examples. There is obtained a resin which is readily soluble in oil. The resin yields varnishes which are fast to light and resistant to atmospheric influences.

(7) Into a solution of 300 parts of colophony in 400 parts of chlorobenzene, chlorine is introduced at a temperature of about 5° C.–10° C. until the chlorine content of the solution—after having been kept for one day at ordinary temperature and having been freed from the chlorine dissolved therein by a current of air—corresponds to about one atom of chlorine: 4 mols of abietic acid. If the fused mass is then heated evolution of hydrogen chloride begins owing to interaction between the chlorinated rosin acid and the non-chlorinated portion of the resin. As soon as the reaction is complete, 35 parts of glycerine are added, the temperature being maintained for 4 hours at 240° C.–260° C.; the volatile constituents are then eliminated by distillation. After the mass has been allowed to cool, a light-brown clear resin is obtained which is suitable for preparing varnishes.

(8) 250 parts of an ester resin obtained by esterifying French colophony with glycerine are mixed with 75 parts of a product which consists mainly of di-ω-chloromethylxylene and is obtainable by reacting with hydrochloric acid and formaldehyde of 30 per cent. strength upon meta-xylene; the mixture is heated as described in the preceding examples, hydrogen chloride being evolved. The fused mass is kept for 3 hours at 180° C.–200° C. and then for 2 hours at 200° C.–230° C. under reduced pressure. There is obtained an oil-soluble, brownish-yellow resin having a softening point higher than that of the resin ester. The resin is soluble in benzine, benzene and linseed oil. When mixed with drying oils it yields well drying varnishes which are fast to light and resistant to atmospheric influences.

(9) 30 parts of anisol containing two Cl.CH$_2$-groups are fused together with 150 parts of colophony and the fused material is heated to 200° C. After the evolution of hydrochloric acid gas has ceased, the temperature is maintained for one hour at 200° C.–210° C., whereupon the product is esterified with 15 parts of glycol by heating it for 3 hours to a temperature of between 240° C. and 250° C. volatile constituents still present are eliminated while applying a reduced pressure. The resin obtained is of a light-yellow color and very readily soluble in benzine and oil. It can be boiled with drying oils to yield varnishes which are very fast to light and resistant to atmospheric influences.

(10) 300 parts of French colophony are heated together with a solution of 180 parts of salicylic acid containing Cl.CH₂-groups in 180 parts of commercial xylene. Evolution of hydrogen chloride commences suddenly at a temperature just above 100° C., and the reaction mixture darkens in color. The temperature may be raised in the same degree as the evolution of gas slackens, until it reaches 210° C. 30 parts of glycerine are then added whereupon the mixture is heated to 240° C.–250° C. until esterification is complete. The clear light resin thus obtained is readily soluble in benzine and oils.

(11) 100 parts of xylene which contains one chlorine atom in each side chain and several chlorine atoms in the nucleus are fused, while stirring, together with 400 parts of so-called "Hercules Resin" (obtainable from the resin-containing roots of pines) until the evolution of hydrochloric acid gas is complete. 40 parts of glycerine and 100 parts of xylene are then added, the temperature being kept for about 3 hours at 245° C.–250° C. The resinous fused mass obtained is practically free from chlorine; after the volatile parts have been removed by a vacuum distillation it constitutes a light hard resin whose softening point lies at 122° C.–124° C. The resin has a low acid number and a content of chlorine of about 1 per cent. It may readily be worked up with drying oils to form light resins which are fast to light and resistant to atmospheric influences.

(12) 150 parts of so-called "Hercules Resin" are fused together with 50 parts of dry 1-ω-chloromethylnaphthalene; the fused material is gradually heated to 200° C. until the evolution of hydrogen chloride is complete. 15 parts of glycol are then added and esterification is caused by keeping the mixture for 3–4 hours at a temperature of between 240° C.–250° C. The volatile constituents are eliminated from the fused mass by a subsequent distillation under reduced pressure. A light solid resin is obtained which may be boiled with drying oils and yields varnishes of a good elasticity, solidity, fastness to light and resistance to atmospheric influences.

(13) 200 parts of American colophony are fused together with 60 parts of di-(4-chloromethyl)-diphenyl, obtainable by reacting with formaldehyde and hydrochloric acid upon diphenyl; the fused mass is maintained at 150° C.–180° C. until the evolution of hydrogen chloride is complete. 50 parts of xylene and 20 parts of pentaerythrite are then added and the mixture is gradually heated to 240° C.–245° C. The mixture is kept at this temperature until the acid number of the product is about 10. The product is then distilled for a short time under reduced pressure. There is obtained a yellow resin having a high softening point and a great hardness. The resin is readily soluble in benzine and can be boiled with drying oils to obtain valuable varnishes.

We claim:

1. The process which comprises reacting upon a natural resin with an aromatic compound containing the group

wherein one X represents a halogen atom and the other X represents a hydrogen or a halogen atom so as to form a condensation product while splitting off hydrogen halide and esterifying the carboxylic groups contained in the resin by means of a polyhydric alcohol.

2. The process which comprises reacting upon a natural resin with an aromatic compound containing the group

wherein one X represents a halogen atom and the other X represents a hydrogen or a halogen atom at a temperature between about 150° C. and about 200° C. so as to form a condensation product while splitting off hydrogen halide and esterifying the carboxylic groups contained in the resin by means of a polyhydric alcohol.

3. The process which comprises reacting upon a natural resin with an aromatic compound containing the group

wherein one X represents a halogen atom and the other X represents a hydrogen or a halogen atom so as to form a condensation product while splitting off hydrogen halide and esterifying the carboxylic groups contained in the resin by means of glycerine.

4. The process which comprises reacting upon a natural resin with a compound of the benzene series containing the group halogen —CH₂— so as to form a condensation product while splitting off hydrogen halide and esterifying the carboxylic groups contained in the resin by means of a polyhydric alcohol.

5. The process which comprises reacting upon a natural resin with a compound of the benzene series containing the group halogen —CH₂— so as to form a condensation product while splitting off hydrogen halide and esterifying the carboxylic groups contained in the resin by means of glycerine.

6. The process which comprises reacting upon a natural resin with a compound of the benzene series containing the group halogen —CH₂— at a temperature between about 150° C. and about 200 C. so as to form a condensation product while splitting off hydrogen halide and esterifying the carboxylic groups contained in the resin by means of glycerine.

7. The process which comprises reacting with xylene the alkyl groups of which are partly chlorinated upon a natural resin so as to form a condensation product and esterifying the carboxylic groups of the resin with glycerine.

8. The process which comprises reacting with di-ω-chloromethylxylene upon a natural resin so as to form a condensation product and esterifying the carboxylic groups of the resin with glycerine.

9. Natural resins the carboxylic groups of which are esterified by polyhydric alcohols, the nucleus being condensed with the evolution of hydrogen halide with a compound of the formula:

wherein R represents an aromatic nucleus which may contain an oxygen containing substituent and/or alkyl groups, one X represents a halogen atom, the other X represents a hydrogen or a halogen atom.

10. Natural resins the carboxylic groups of which are esterified by glycerine, the nucleus being condensed with the evolution of hydrogen halide with a compound of the formula:

wherein R represents an aromatic nucleus which may contain an oxygen containing substituent and/or alkyl groups, one X represents a halogen atom, the other X represents a hydrogen or a halogen atom.

11. Natural resins the carboxylic groups of which are esterified by polyhydric alcohols, the nucleus being condensed with a group of the formula:

$$-CH_2-R$$

wherein R represents a benzene nucleus containing an alkyl group.

12. A natural resin having the carboxylic groups esterified by glycerine, the nucleus being condensed with the group —$CH_2$— benzene-alkyl, this product representing a yellow resin, soluble in oils and benzene.

GEORG KRANZLEIN.
ARTHUR VOSS.